United States Patent [19]
Price et al.

[11] 3,939,977
[45] Feb. 24, 1976

[54] SEALING RING

[76] Inventors: Macy J. Price, 44560 Country Lane, Northville, Mich. 48167; Earl H. Pickett, 5902 Edinbrugh, Apt. 103, Plymouth, Mich. 48170

[22] Filed: July 24, 1974

[21] Appl. No.: 491,268

[52] U.S. Cl............ 206/400; 24/201 S; 24/265 AL; 206/53
[51] Int. Cl.².......................................... B65D 85/67
[58] Field of Search............ 24/16 PB, 30.5 P, 68 F, 24/81 FC, 201 S, 230 F, 230 CF, 265 AL; 206/53, 400; 220/324; 242/197

[56] References Cited
UNITED STATES PATENTS

| | | | |
|---|---|---|---|
| 3,095,969 | 7/1963 | Morrison | 206/400 |
| 3,110,647 | 11/1963 | Tong | 24/230 F |
| 3,156,353 | 11/1964 | Harnish | 206/400 |
| 3,227,269 | 1/1966 | Martinez et al. | 206/400 |
| 3,482,289 | 12/1969 | Stradella | 24/201 S |
| 3,833,114 | 9/1974 | Osojnak | 206/53 |

*Primary Examiner*—William Price
*Assistant Examiner*—Steven E. Lipman
*Attorney, Agent, or Firm*—Donald L. Wood

[57] ABSTRACT

A sealing ring for computer tape reels and the like wherein the sealing ring comprises a molded unitary strip of homogeneous plastics material adapted to be formed into a loop to sealingly encircle the reel. The strip has a live transverse hinge adjacent one strip end defining a latch portion between the hinge and that end, and a transverse seating surface is provided on the radially inner side of the strip adjacent the hinge. In use, the strip is wrapped around the reel, the transverse end surface of the other end of the strip, remote from the latch portion, is abutted against the transverse seating surface to dispose the latch portion in overlapping relation to the other strip end, and the latch portion is pivoted inwardly about the hinge axes to latchingly interengage latching elements defined on the radially inner surface of the latch portion and on the overlapped portion of the other strip end. In one disclosed embodiment, the coacting latching elements comprise an aperture in the latch portion coacting with a latching finger projecting radially outwardly from the radially outer surface of the overlapped end portion. In another disclosed embodiment, the coacting latching elements comprise a latching finger projecting radially inwardly from the radially inner surface of the latch portion for coacting with a latching aperture provided in the overlapped end portion.

9 Claims, 11 Drawing Figures

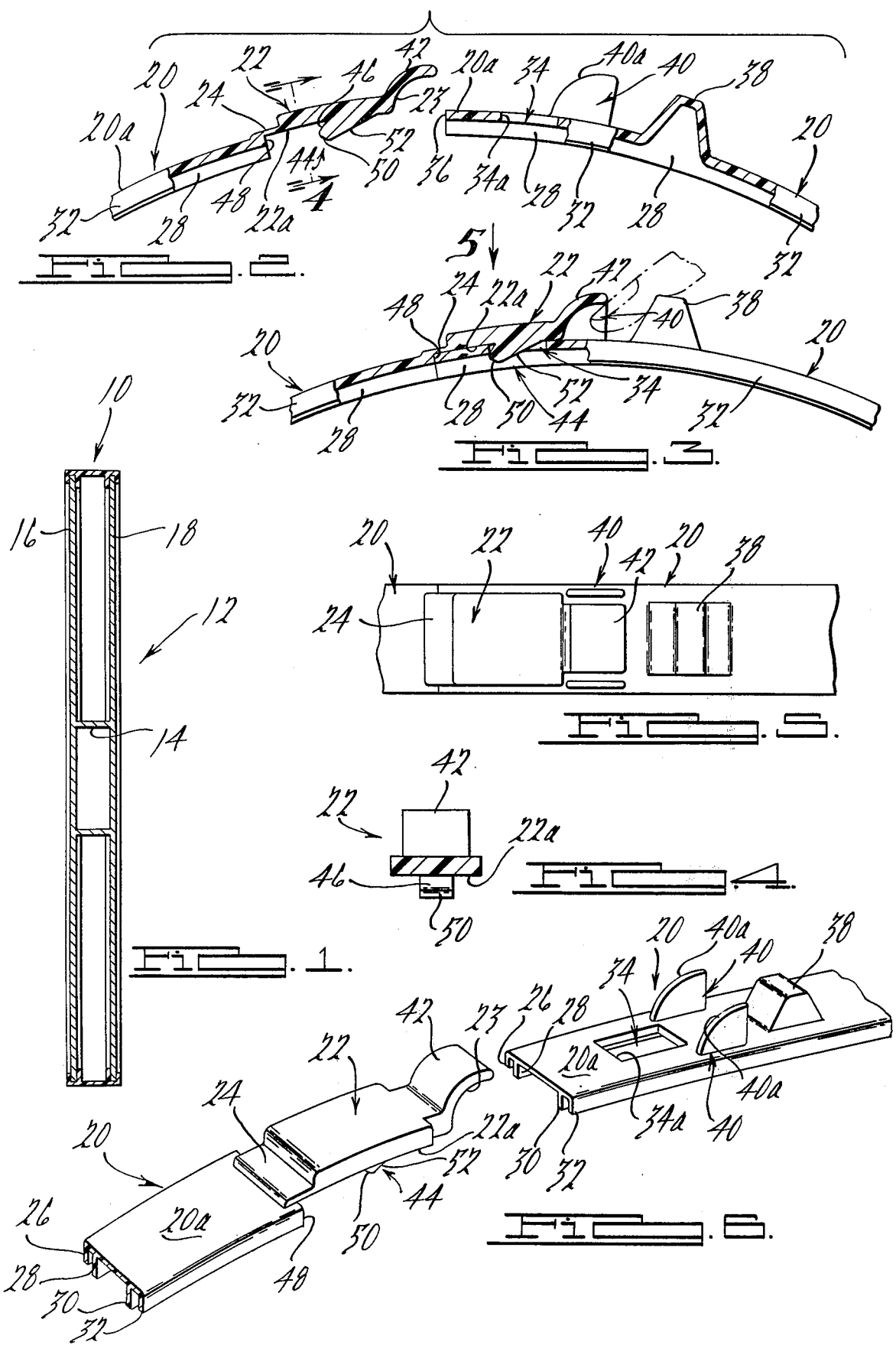

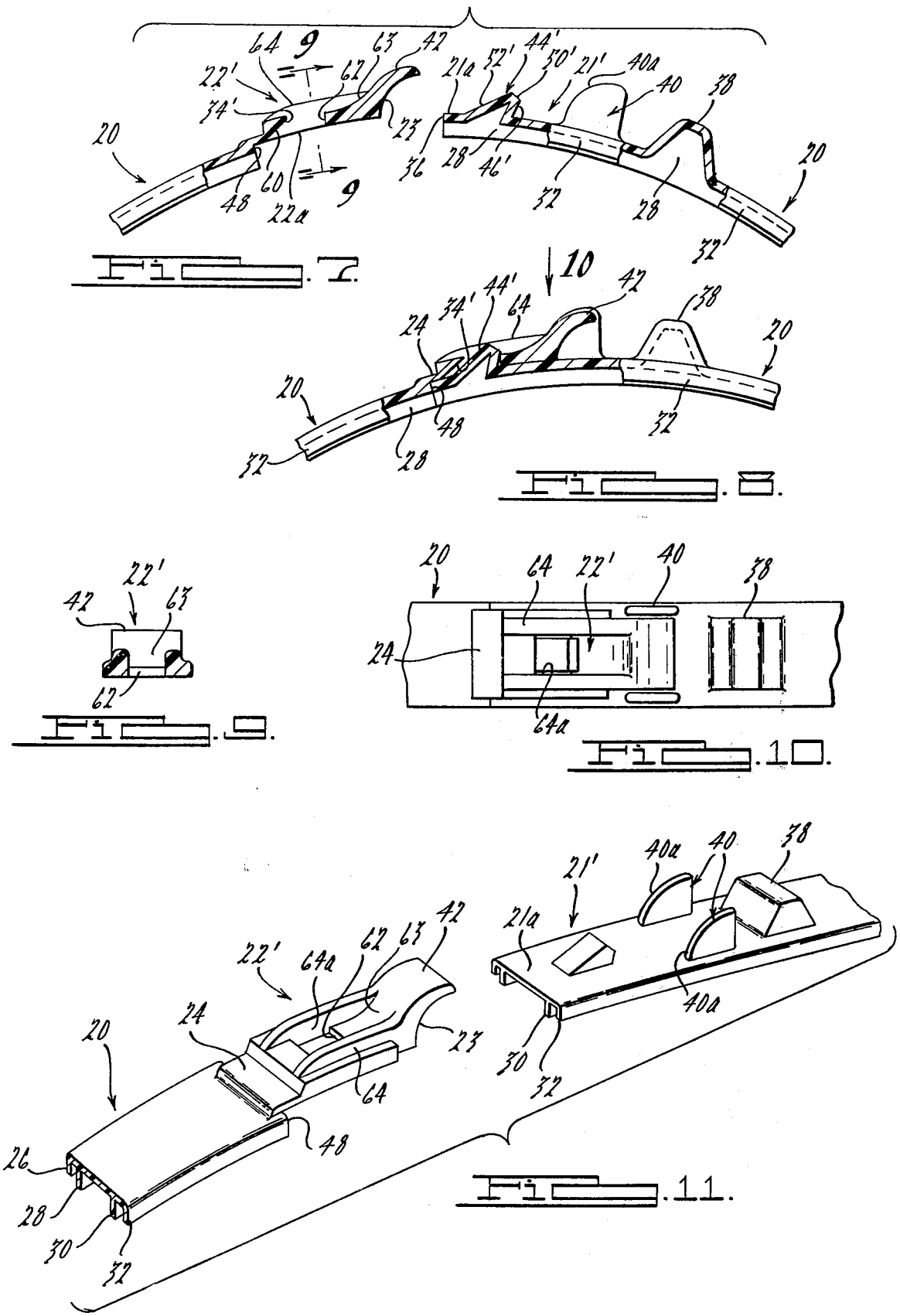

SEALING RING

BACKGROUND OF THE INVENTION

This invention relates to sealing rings of the type adapted to sealingly encircle a reel for computer tape or the like.

Various forms of sealing rings are presently available. However, the available rings are either relatively expensive, due to a relatively complicated design, or relatively ineffective, due to design deficiencies introduced in an attempt to reduce cost.

SUMMARY OF THE INVENTION

The primary object of the present invention is to provide an inexpensive yet highly effective sealing ring.

A more specific object is to provide a sealing ring of very low cost which will yet effectively seal the associated reel and maintain its effective sealing action over a long product life.

These objects are accomplished according to the present invention by the provision of a sealing ring comprising a molded unitary strip of homogeneous plastics material having an integral latching finger carried by one end portion of the strip and a coacting latching aperture provided in the other end portion of the strip. In use, the end portions are brought into overlapping relationship with the extent of overlapping defined by the abutment of the transverse end surface of the overlapped end portion against a transverse seating surface defined on the radially inner side of the overlapping end portion, whereafter the end portions are moved together to bring the latching finger and latching aperture into latching engagement.

In the disclosed embodiments of the invention, hinge means interconnect the overlapping end portion to the main body section of the strip so that the overlapping end portion may be pivoted relative to the main body section to facilitate the latching engagement of the latching finger and latching aperture.

In one disclosed emdobiment, the latching finger is provided on the radially inner surface of the overlapping, hingedly connected end portion; in the other disclosed embodiment, the latching finger is provided on the radially outer surface of the overlapped end portion.

Other objects and advantages of the invention will become apparent from the detailed description of the preferred embodiments.

BRIEF DESCRIPTION OF THE DRAWINGS

In the accompanying drawings:

FIG. 1 is a cross-sectional view showing a sealing ring of the invention type sealingly encircling a reel;

FIG. 2 is a fragmentary view of one embodiment of the invention sealing ring showing the ring ends unlatched;

FIG. 3 is a fragmentary view of the FIG. 1 embodiment showing the ring ends latched;

FIG. 4 is a cross-sectional view taken on line 4—4 of FIG. 2;

FIG. 5 is a top view looking in the direction of the arrow 5 in FIG. 3;

FIG. 6 is a fragmentary, perspective view of the FIG. 1 embodiment of the invention sealing ring;

FIG. 7 is a fragmentary view of another embodiment of the invention sealing ring showing the ring ends unlatched;

FIG. 8 is a fragmentary view of the FIG. 7 embodiment showing the ring ends unlatched;

FIG. 9 is a cross-sectional view taken on line 9—9 of FIG. 7;

FIG. 10 is a top view looking in the direction of the arrow 10 in FIG. 8; and

FIG. 11 is a fragmentary, perspective view of the FIG. 7 embodiment of the invention sealing ring.

DETAILED DESCRIPTION OF THE PREFERRED EMBODIMENTS

The invention sealing ring is formed in its entirety as a single unitary strip 10 of homogeneous plastics material such, for example, as polypropelene. Strip 10 is seen in FIG. 1 encircling a reel 12 of the type including a central hollow hub 14 and spaced flanges 16, 18.

The Figure 1–6 Embodiment

Strip 10, as seen in FIG's. 2–6, includes a main body section 20 having an end portion 21; and a latch end portion 22 formed as an integral circumferential extension of the end 25 of main body section 20 remote from end portion 21. Latch portion 22 is hingedly connected to end 25 of main body section 20 by a thin strip section 24 constituting a live transverge hinge. End portion 21 of main body section 20 includes a transverse generally radially extending end surface 36 and a smooth radially outer seating surface 21a extending circumferentially away from end surface 36.

Main body section 20 includes circumferential ribs 26, 28, 30, 32, formed on the radially inner surface of the main body section and extending from end to end thereof. Ribs 26, 28, 30, 32 are adapted to embrace the reel flanges 16, 18 to preclude transverse movement of the strip relative to the reel.

End portion 21 of main body section 20 is provided with a through aperture of opening 34. Opening 34 is rectangular with its major dimension arranged parallel to the longitudinal axis of the strip. A protuberance 38 is formed on the radially outer surface of end portion 21 and a pair of upstanding fins 40 are formed on the radially outer surface of end portion 21 between protuberance 38 and opening 34. Fins 40, in side profile, have an arcuate leading edge 40a and a vertical trailing edge 40b.

Latch portion 22 and hinge section 24 have a transverse dimension slightly less than that of main body section 20. Latch portion 22 terminates in a handle section 42 curving arcuately upwardly from the latch portion. The arcuate curvature of handle section 42 generally matches that of arcuate fin edges 40a and its transverse dimension is slightly less than that of latch portion 22 and slightly less than the transverse spacing between fins 40.

Latching portion 22 has a smooth radially inner seating surface 22a. A latching finger 44 projects radially inwardly from radially inner seating surface 22a. Finger 44 has a transverse dimension slightly less than the minor or transverse dimension of rectangular opening 34. Finger 44, in side profile, includes an undercut latching surface 46, a piloting surface 50, and a trailing surface 52. Latching surface 46 confronts a transverse seating surface 48 extending radially outwardly from the radially inner surface of the strip for intersection with seating surface 22a at the end thereof remote from the free end 23 of latch portion 22. Seating surface 48 will be seen to be constituted by the transverse end surface of end 25 of main body strip section 20. The distance between latching surface 46 and transverse seating surface 48 approximates the distance between end surface 36 and the near transverse edge 34a of opening 34.

In use, strip 10 is wrapped around reel 12 to position ribs 26, 28, 30, 32 on reel flanges 16, 18. Transverse end surface 36 is then abutted against transverse seating surface 48, thereby also bringng the opposite ends of ribs 26, 28, 30, 32 into abutment. Latch portion 22, which has been brought into overlapping relation to end portion 21 by abutment of surfaces 36-48, is then pivoted downwardly about the axis of live hinge 34 by downward pressure on handle section 42 to bring the piloting surface 50 of the latching finger into camming engagement with the transverse edge 34a of opening 34; continued downward pressure on handle section 42 snaps piloting surface 50 past edge 34a to seat radially inner surface 22a on the radially outer surface 21a of end portion 21 and bring latching surface 46 into latching engagement with edge 34a.

In this latched condition, as been seen in FIG. 4, handle section 42 is nestled between fins 40 to protect the latch member from inadvertant unlatching. To intentionally unlatch the invention sealing ring, the operator's thumb may be placed on protuberance 38 with the thumb tip inserted between fins 40 and into the access pocket 54 defined between the radially inner surface of handle section 42 and the confronting portion of seating surface 21a, whereupon the thumb may be flipped upwardly, using protuberance 38 as a fulcrum, to flip handle section 42 upwardly and disengage latching finger 44 from opening 34.

Figure 7-11 Embodiment

In the embodiment of FIG. 7-11, the reference numerals are identical to those used in the FIG. 1-6 embodiment where the elements are unchanged between the two embodiments, and the same reference numeral with a prime added is used for elements that are similar as between the two embodiments. The FIG. 7-11 embodiment is generally similar to the embodiment of FIG's. 1-6 except that the relative locations of the latching finger and coacting opening are reversed. Specifically, latching end portion 22' now defines the latching opening and end portion 21' now carries the latching finger. End portion 21' includes a latching finger 44' formed as a molded-in protuberance in the strip. Finger 44' includes an undercut latching surface 46', a piloting surface 50', and a trailing surface 52'.

Latching portion 22' defines an opening 34' for coaction with latching finger 44'. Opening 34' is rectangular with its major dimension arranged parallel to the longitudinal axis of the strip. The rear edge of opening 34' is defined by an angled wall surface 60 having a slope approximating the slope of latching finger trailing surface 52'. The forward edge of opening 34' is defined by a generally radially extending edge surface 62 formed at the lower terminus of a downwardly sloping surface 63 formed as a smooth curvilinear continuation of the arcuate upper surface of handle portion 42. The side edges of opening 34' are defined by the confronting inner surfaces 64a of a pair of reinforcing fins 64 beginning at the rear edge of latch portion 22' and blending at their foward ends in handle portion 42. The distance between latching surface 46' and transverse end surface 36 approximates the distance between edge surface 62 and transverse seating surface 48.

The operation of the sealing ring of FIG's. 7-11 is essentially the same as that of the embodiment of FIG's. 1-6.

The manufacture of the invention sealing ring in either disclosed embodiment represents the ipitomy of simplicity. Specifically, the sealing ring is totally formed in a single, straightforward molding operation. The strip comes out of the dye in the form of a flat strip which is ready for use.

The invention sealing ring will be seen to provide an extremely low manufacturing cost, and yet extensive testing has indicated that it provides excellent sealing for the related tape reel as well as a long product life.

We claim:

1. A sealing ring for use with a reel of the type including a central hub and spaced flanges, said ring comprising a molded unitary strip of homogeneous plastics material adapted to be formed into a loop to sealingly encircle said reel and including:
   A. means defining a first end portion having a transverse, generally radially extending end surface and a smooth radially outer seating surface extending circumferentially away from said end surface;
   B. means defining a second end portion adapted to be brought into overlapping relationship to said first end portion and having a smooth radially inner circumferentially extending seating surface adapted to seat on the smooth radially outer circumferentially extending seating surface of said first end portion;
   C. means defining a transverse seating surface extending generally radially inwardly from said radially inner circumferentially extending surface at the end thereof remote from the free end of said second end portion;
   D. means defining an aperture in one of said end portions within the smooth surface area of the circumferentially extending seating surface of that end portion; and
   E. means defining a latching finger projecting radially from the smooth surface area of the circumferentially extending seating surface of the other end portion for latching coaction with said aperture to releasably latch said end portions together in lapping disposition with said radially inner and outer circumferentially extending seating surfaces in juxtaposition and the transverse end surface of said first end portion abuttingly urged against said transverse seating surface.

2. A sealing ring according to claim 1 and further including
   F. rib means defined on the radially inner surface of said strip adapted to seat within the spaced flanges of said reel to preclude transverse movement of said strip relative to said reel, said rib means extending circumferentially from a location adjacent said transverse end surface to a location adjacent said transverse seating surface so that the opposite ends of said rib means are abuttingly urged against each other in the lapped and latched disposition of said end portions.

3. A sealing ring according to claim 1 wherein
   F. said latching finger projects radially outwardly from the radially outer seating surface of said first end portion; and
   G. said aperture is defined in said second end portion.

4. A sealing ring according to claim 1 wherein

F. said latching finger projects radially inwardly from the radially inner seating surface of said second end portion; and G. said aperture is defined in said first end portion.

5. A sealing ring according to claim 1 wherein

F. a transverse live hinge is defined on said strip adjacent said transverse seating surface, whereby said second end portion is movable pivotally at said hinge relative to the main body of said strip to facilitate latching and unlatching movement of said finger relative to said aperture.

6. A sealing ring for use with a reel of the type including a central hub and spaced flanges, said ring comprising a molded unitary strip of homogeneous plastics material adapted to be formed into a loop to sealingly encircle said reel and including A. a main body strip section having
 1. rib means on its radially inner surface extending from end to end thereof and adapted to seat within the spaced flanges of said reel to preclude transverse movement of the strip on the reel, and
 2. an end portion having a transverse end surface and a smooth radially outer seating surface extending circumferentially away from said end surface;

B. a latch portion
 1. adapted to form an integral circumferential extension of the end of said main body section remote from said end portion;
 2. adapted to be brought into overlapping relationship to said end portion, and
 3. defining a smooth radially inner seating surface adapted to seat in overlapping fashion on the smooth radially outer seating surface of said end portion;

C. hinge means integrally and hingedly connecting said latch portion to said remote main body section end in a manner to leave at least a portion of the transverse end surface of said remote end exposed to define a transverse seating surface;

D. means defining an aperture in one of said portions; and

E. means defining a latching finger projecting radially from the seating surface of the other portion;

whereby said transverse end surface of said end portion may be abutted against said transverse seating surface and said latch portion may be moved inwardly to seat the smooth radially inner seating surface of said latch portion on the radially outer seating surface of said end portion and latchingly engage said latching finger and said aperture.

7. A sealing ring according to claim 6 wherein

F. the free end of said latch portion is configured to define, with the ring in latched configuration, an access pocket between the radially inner surface of the free end of the latch portion and the confronting portion of said radially outer seating surface, whereby the tip of an operator's finger may be inserted into said pocket to facilitate unlatching of said ring.

8. A sealing ring according to claim 7 and further including

G. means defining a molded-in protuberance formed on the radially outer surface of said strip at a location therealong adjacent to the access pocket defined in the latched configuration of the ring.

9. A sealing ring according to claim 8 and further including

H. a pair of integral, transversely spaced fins projecting radially outwardly from the radially outer surface of said strip at a location therealong circumferentially between said protuberance and said transverse end surface of said end portion, said fins being transversely spaced and circumferentially positioned so as to nestle the free end of said latch portion therebetween in the latched configuration of said ring and thereby, in coaction with said protuberance, discourage inadvertent unlatching of said ring.

* * * * *